United States Patent
Tsukada

(10) Patent No.: US 8,939,127 B1
(45) Date of Patent: Jan. 27, 2015

(54) STOP CONTROL APPARATUS FOR INTERNAL COMBUSTION ENGINE

(75) Inventor: Yuta Tsukada, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/373,070

(22) PCT Filed: Apr. 11, 2012

(86) PCT No.: PCT/JP2012/059902
§ 371 (c)(1),
(2), (4) Date: Jul. 18, 2014

(87) PCT Pub. No.: WO2013/153634
PCT Pub. Date: Oct. 17, 2013

(51) Int. Cl.
*F02D 9/00* (2006.01)
*F02D 29/02* (2006.01)
*F02D 31/00* (2006.01)

(52) U.S. Cl.
CPC .............. *F02D 29/02* (2013.01); *F02D 31/001* (2013.01); *F02D 2700/07* (2013.01)
USPC .......................... 123/376; 123/397; 123/398

(58) Field of Classification Search
CPC .................................................. F02D 31/004
USPC ......... 123/376, 397, 398, 399, 179.3, 179.18, 123/90.15; 701/112
See application file for complete search history.

(56) References Cited

U.S. PATENT DOCUMENTS 8,589,056 B2 * 11/2013 Hozumi et al. ............... 701/112
2014/0172219 A1 * 6/2014 Nakanishi et al. ............. 701/22

FOREIGN PATENT DOCUMENTS

| EP | 2 345 807 A1 | 7/2011 |
| JP | 2004-232539 A | 8/2004 |
| JP | 2007-263051 A | 10/2007 |
| JP | 2007-309276 A | 11/2007 |
| JP | 2007-327364 A | 12/2007 |
| JP | 2008-274884 A | 11/2008 |
| JP | 2010-116833 A | 5/2010 |
| JP | 2010-248949 A | 11/2010 |
| JP | 2011-231640 A | 11/2011 |
| JP | 2012-036864 A | 2/2012 |
| WO | 2013/088526 A1 | 6/2013 |

* cited by examiner

*Primary Examiner* — Hai Huynh
(74) *Attorney, Agent, or Firm* — Sughrue Mion, PLLC

(57) ABSTRACT

A stop control apparatus (100) for an internal combustion engine performs stop control of a three-or-less cylinder internal combustion engine (200). The stop control apparatus for the internal combustion engine is provided with: a determining device (161) configured to determine a compression stroke immediately before the internal combustion engine stops; and a throttle valve controlling device (168) configured to control an opening degree of a throttle valve (208) to be a predetermined opening degree while an intake valve (211) is closed in all cylinders, in the compression stroke immediately before the internal combustion engine stops, which is determined by the determining device. This reduces an influence of an intake negative pressure in an intake stroke, and makes it possible to preferably control the crank angle when the engine stops, even in the three-or-less cylinder internal combustion engine.

5 Claims, 13 Drawing Sheets

STOP CONTROL APPARATUS FOR INTERNAL COMBUSTION ENGINE

CROSS REFERENCE TO RELATED APPLICATIONS

This is a National Stage of International Application No. PCT/JP2012/059902 filed Apr. 11, 2012, the contents of which are incorporated herein by reference in its entirety.

TECHNICAL FIELD

The present invention relates to a stop control apparatus for an internal combustion engine configured to control a stop operation of the internal combustion engine installed in a vehicle such as, for example, an automobile.

BACKGROUND ART

This type of internal combustion engine is required to perform such control that a crank angle when the engine stops is within a predetermined range, for example, in order to suppress vibration when starting the engine. For the control of the crank angle, for example, a method of increasing a throttle opening degree immediately before the internal combustion engine stops is used. For example, it is proposed in Patent document 1 that the variation of the crank angle when the engine stops is reduced by increasing the throttle opening degree in an intake stroke immediately before the internal combustion engine stops and by increasing compression pressure in a compression stroke. For example, it is also proposed in Patent document 2 that the throttle opening degree in stop control is determined in accordance with the crank angle when the number of revolutions of the internal combustion engine is a predetermined value. It is also proposed in Patent document 3 that the throttle opening degree in stop control is determined in accordance with intake air density of the internal combustion engine.

PRIOR ART DOCUMENT

Patent Document

Patent document 1: Japanese Patent Application Laid Open No. 2004-232539
Patent document 2: Japanese Patent Application Laid Open No. 2010-116833
Patent document 3: Japanese Patent Application Laid Open No. 2007-327364

SUMMARY OF INVENTION

Subject to be Solved by the Invention

As described in the Patent documents 1 to 3 described above, in the method of increasing the throttle opening degree, a piston in the intake stroke is braked due to intake negative pressure. Here, in the case of a four-or-more cylinder internal combustion engine, since any of the cylinders is always in the intake stroke, a braking effect due to the intake negative pressure becomes constant and the crank angle is easily controlled. In the case of a three-or-less cylinder internal combustion engine, however, since there can be a time in which none of the cylinders is in the intake stroke, the braking effect due to the intake negative pressure does not become constant, and the crank angle is hardly controlled. In other words, in the technologies described in the Patent documents 1 to 3 described above, there is such a technical problem that it is likely difficult to control the crank angle due to the generation of the intake negative pressure.

In view of the aforementioned problems, it is therefore an object of the present invention to provide a stop control apparatus for an internal combustion engine configured to preferably control the crank angle when the engine stops, even in the case of the three-or-less cylinder internal combustion engine.

Means for Solving the Subject

The above object of the present invention can be achieved by a stop control apparatus for an internal combustion engine configured to perform stop control of a three-or-less cylinder internal combustion engine, said stop control apparatus provide with: a determining device configured to determine a compression stroke immediately before the internal combustion engine stops; and a throttle valve controlling device configured to control an opening degree of a throttle valve to be a predetermined opening degree while an intake valve is closed in all cylinders, in the compression stroke immediately before the internal combustion engine stops, which is determined by said determining device.

The stop control apparatus for the internal combustion engine of the present invention performs the stop control of the three-or-less cylinder internal combustion engine. Even in the case of a four-or-more cylinder engine, any engine that can temporarily drive as the three-or-less engine due to cylinder stop or the like and that drives as the three-or-less engine in the stop control described later is included in the internal combustion engine of the present invention. The internal combustion engine of the present invention is configured, for example, as a power element which can supply power to a drive shaft of a vehicle, and can adopt various aspects regardless of, for example, a fuel type, a fuel supply aspect, a fuel combustion aspect, a configuration of an intake/exhaust system, cylinder arrangement and the like.

In operation of the stop control apparatus for the internal combustion engine of the present invention, firstly, the compression stroke immediately before the internal combustion engine stops is determined by the determining device. The compression stroke immediately before the internal combustion engine stops can be determined, for example, from whether or not the number of revolutions of the internal combustion engine is less than or equal to a threshold value set in advance.

If the compression stroke immediately before the internal combustion engine stops is determined, the opening degree of the throttle valve (hereinafter referred to as a "throttle opening degree" as occasion demands) in the compression stroke immediately before the internal combustion engine stops (i.e. the compression stroke which is determined by the determining device) is controlled by the throttle valve controlling device. The throttle valve controlling device sets the throttle opening degree to be the predetermined opening degree while the intake valve is closed in all the cylinders, in the compression stroke immediately before the internal combustion engine stops.

Incidentally, the "predetermined opening degree" herein is an opening degree with which negative pressure in an intake path (specifically, an intake manifold, etc.) (hereinafter referred to as "intake negative pressure" as occasion demands) can be reduced to the extent that an effect described later is exerted, and is set as a small opening degree as possible.

If the intake negative pressure is reduced by the control of the throttle opening degree, the braking effect of the piston due to the intake negative pressure is reduced in the intake stroke after the compression stroke in which the throttle opening degree is controlled. Moreover, the braking effect due to the compression pressure is increased in the compression stroke after the intake stroke (i.e. the next compression stroke of the compression stroke in which the throttle opening degree is controlled). This makes it easy to stop the crank angle in a state of the compression stroke (preferably, immediately before top dead center in which vibration at the start of the internal combustion engine can be effectively suppressed).

The intake negative pressure after the throttle opening degree control is preferably set to zero in order to sufficiently exert the aforementioned effect (i.e. intake pressure is preferably equal to atmospheric pressure). Even if the intake negative pressure is not zero, the aforementioned effect is properly obtained if the intake negative pressure is reduced to a greater or lesser degree.

Typically, the effect of reducing the intake negative pressure increases as the throttle opening degree is increased. Thus, for example, if the predetermined opening degree is always set fully open, the intake negative pressure can be effectively reduced. However, if the throttle opening degree is set fully open every time the internal combustion engine is stopped, that increases a load on each member for opening or closing the throttle valve (e.g. a drive motor and a spring of the throttle valve, etc.). Thus, if the throttle opening degree is unnecessarily increased, the life of the throttle valve is likely reduced.

In the present invention, however, as described above, the throttle opening degree is controlled to be an opening degree with which the intake negative pressure can be reduced and to be as a small opening degree as possible. Therefore, it is possible to reduce the load on the throttle valve described above while reducing an influence by the intake negative pressure.

In the case of the four-or-more cylinder internal combustion engine, any of the cylinders is always in the intake stroke. Thus, the braking effect due to the intake negative pressure becomes constant, and the crank angle is easily controlled. In the case of the three-or-less cylinder internal combustion engine as described in the present invention, however, there can be a period in which none of the cylinders is in the intake stroke. Thus, the braking effect due to the intake negative pressure does not become constant, and the crank angle is hardly controlled. Therefore, as described above, the present invention in which the braking effect can be appropriately controlled is extremely useful in practice.

As explained above, according to the stop control apparatus for the internal combustion engine of the present invention, it is possible to preferably control the crank angle when the engine stops, even in the case of the three-or-less cylinder internal combustion engine.

In one aspect of the stop control apparatus for the internal combustion engine of the present invention, wherein said throttle valve controlling device increases the predetermined opening degree as the number of revolutions of the internal combustion engine increases when the opening degree of the throttle valve is the predetermined opening degree.

In the internal combustion engine of the present invention, as the number of revolutions of the internal combustion engine increases, a period from when the intake valve is closed in all the cylinders to when the intake valve is opened in any of the cylinders becomes shorter. This shortens a period from when the opening degree of the throttle valve is set to be the predetermined opening degree to when the next intake stroke is started. Thus, in order to stop the crank angle in proper position if the number of revolutions of the internal combustion engine is large, it is required to reduce the intake negative pressure in a shorter period than in cases where the number of revolutions of the internal combustion engine is small.

In this aspect, however, as the number of revolutions of the internal combustion engine increases, the predetermined opening degree is increased. Thus, even if the period from the control of the throttle opening degree to the start of the next intake stroke is short, the intake negative pressure can be effectively reduced by increasing the throttle opening degree upon control. Moreover, if the period from the control of the throttle opening degree to the start of the next intake stroke is long, the load on the throttle valve is further reduced by reducing the throttle opening degree upon control.

In one aspect of the stop control apparatus for the internal combustion engine of the present invention, wherein said throttle valve controlling device increases the predetermined opening degree as negative pressure of an intake path increases when the opening degree of the throttle valve is the predetermined opening degree.

As described above, the purpose of the control of the throttle opening degree is to reduce the influence of the intake negative pressure when the internal combustion engine is stopped. Thus, if the intake negative pressure is large, it is required to increase the effect of reducing the intake negative pressure.

In this aspect, however, as the intake negative pressure increases, the predetermined opening degree is increased. Thus, if the intake negative pressure is large, the throttle opening degree upon control is increased, and the effect of reducing the intake negative pressure is increased. Moreover, if the intake negative pressure is small, the throttle opening degree upon control is reduced, and the load on the throttle valve is further reduced.

In one aspect of the stop control apparatus for the internal combustion engine of the present invention, wherein said throttle valve controlling device controls the opening degree of the throttle valve to be the predetermined opening degree in the case of a crank angle at which the intake valve is closed in all the cylinders.

According to this aspect, the throttle opening degree is controlled at an earlier stage after the intake valve is closed in all the cylinders. It is thus possible to lengthen the period from the control of the throttle opening degree to the next intake stroke. Therefore, it is possible to sufficiently reduce the intake negative pressure while making the predetermined opening degree as small as possible.

Since it is only necessary to control the throttle valve according to timing in which the intake valve is closed, the processing can be relatively simplified.

Incidentally, the expression, "in the case of a crank angle at which the intake valve is closed in all the cylinders", in this aspect is not limited to a moment of becoming the crank angle in which the intake valve is closed in all the cylinders, but is some range of concept including a period such as a response delay which can occur when the throttle opening degree is controlled. The aforementioned effect is properly obtained if the throttle opening degree is controlled not only at the moment of becoming the crank angle in which the intake valve is closed in all the cylinders but also in a short time from the moment.

In one aspect of the stop control apparatus for the internal combustion engine of the present invention, wherein said throttle valve controlling device increases the predetermined opening degree with increasing a distance from the throttle valve to a cylinder to be stopped in the compression stroke.

In a cylinder which is more distant from the throttle valve, a time from when the throttle opening degree is controlled to when the intake pressure near the intake valve becomes low is lengthened, in comparison with a cylinder which is less distant from the throttle valve. Thus, if it is desired to stop the cylinder which is more distant from the throttle valve, the higher effect of reducing the intake negative pressure is required.

In this aspect, however, the predetermined opening degree is increased with increasing the distance from the throttle valve to the cylinder to be stopped. Thus, in the case of stopping the more distant cylinder in which the intake negative pressure is hardly reduced, the throttle opening degree upon control is increased, and the effect of reducing the intake negative pressure is increased. Moreover, in the case of stopping the less distant cylinder in which the intake negative pressure is easily reduced, the throttle opening degree upon control is reduced, and the load on the throttle valve is further reduced.

In one aspect of the stop control apparatus for the internal combustion engine of the present invention, provide with: a motor configured to output torque to a crank shaft of the internal combustion engine; and a motor controlling device configured to control said motor to output adjusting torque when the internal combustion engine stops, the adjusting torque being configured to adjust a crank angle when the internal combustion engine stops to be a predetermined value.

According to this aspect, when the internal combustion engine stops, the adjusting torque for adjusting the crank angle when the internal combustion engine stops to be the predetermined value is outputted from the motor configured as a motor generator such as, for example, a motor generator mounted on a hybrid vehicle. The adjusting torque is outputted typically before the throttle opening degree becomes the predetermined opening degree. Moreover, whether or not to output the adjusting torque can be determined, for example, from the number of revolutions of the internal combustion engine or the like.

The output of the adjusting torque can further increase the accuracy of the crank angle when the internal combustion engine stops. This further increases the stop position accuracy of the crank angle which is increased by setting the throttle opening degree to be the predetermined opening degree.

The adjusting torque is calculated, for example, on the basis of the crank angle of the internal combustion engine. If the adjusting torque is calculated in accordance with the number of revolutions of the motor, the deviation of the total amount of energy due to a difference in the number of revolutions is considered. It is thus possible to control the crank angle with higher accuracy when the engine stops.

The operation and other advantages of the present invention will become more apparent from the embodiment explained below.

MODES FOR CARRYING OUT THE INVENTION

Hereinafter, an embodiment of the present invention will be explained with reference to the drawings.

<Hybrid Vehicle>

Figure 1:
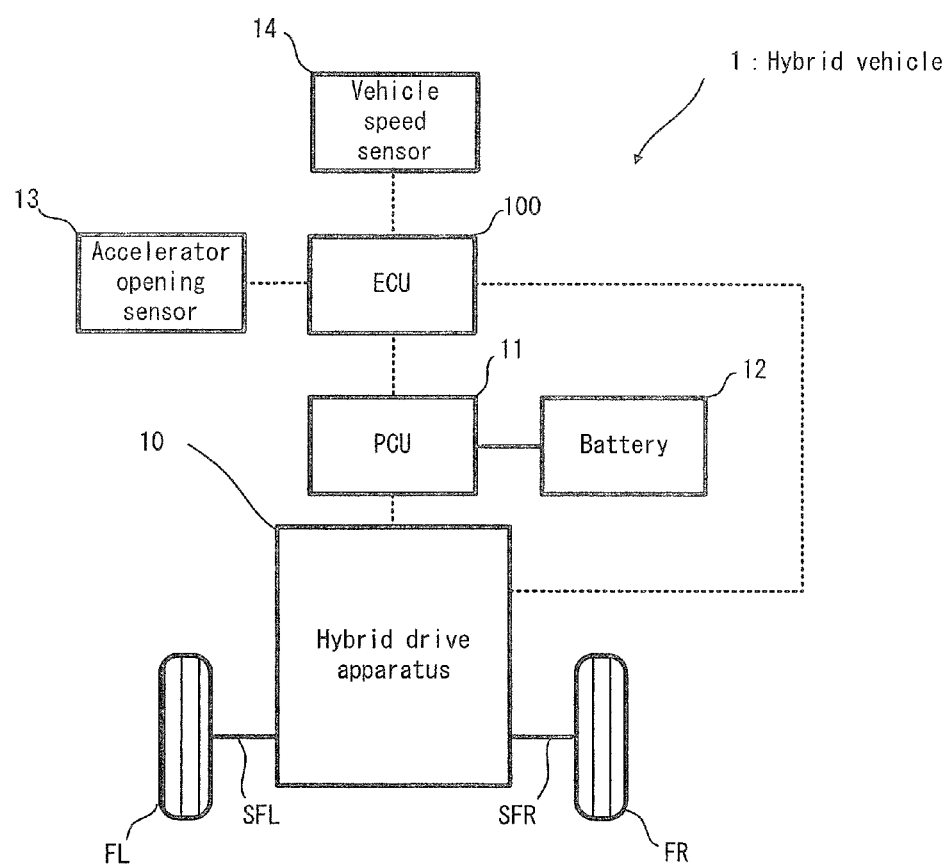
FIG. 1 is a schematic configuration diagram conceptually illustrating a configuration of a hybrid vehicle.

Firstly, an entire configuration of a hybrid vehicle in which a stop control apparatus for an internal combustion engine in the embodiment is installed will be explained with reference to FIG. 1. FIG. 1 is a schematic configuration diagram conceptually illustrating the configuration of the hybrid vehicle.

In FIG. 1, a hybrid vehicle 1 in the embodiment is provided with a hybrid drive apparatus 10, a power control unit (PCU) 11, a battery 12, an accelerator opening sensor 13, a vehicle speed sensor 14, and an ECU 100.

The ECU 100 is one example of the "stop control apparatus for the internal combustion engine" of the present invention. The ECU 100 is provided with a central processing unit (CPU), a read only memory (ROM), a random access memory (RAM), and the like. The ECU 100 is an electronic control unit configured to control the operation of each unit of the hybrid vehicle 1. The ECU 100 is configured to perform various controls of the hybrid vehicle 1 in accordance with a control program stored in, for example, the ROM or the like.

The PCU 11 converts direct-current (DC) power extracted from the battery 12 into alternating-current (AC) power and supplies it to motor generators MG1 and MG2 described later. The PCU 11 includes a not-illustrated inverter capable of converting AC power generated by the motor generators MG1 and MG2 into DC power and supplying it to the battery 12. In other words, the PCU 11 is a power control unit configured to control input/output of electric power between the battery 12 and each motor generator, or input/output of electric power between the motor generators (i.e. in this case, the electric power is transferred between the motor generators without via the battery 12). The PCU 11 is electrically connected to the ECU 100, and the operation thereof is controlled by the ECU 100.

The battery 12 is a chargeable storage battery which functions as an electric power supply source associated with the electric power for power running of the motor generators MG 1 and MG2. The amount of stored power of the battery 12 can be detected by the ECU 100 or the like.

The accelerator opening sensor 13 is a sensor configured to detect an accelerator opening degree Ta which is a manipulated variable or an operation amount of a not-illustrated accelerator pedal of the hybrid vehicle 1. The accelerator opening sensor 13 is electrically connected to the ECU 100, and the detected accelerator opening degree Ta is referred to by the ECU 100 with a regular or irregular period.

The vehicle speed sensor 14 is a sensor configured to detect a vehicle speed V of the hybrid vehicle 1. The vehicle speed sensor 14 is electrically connected to the ECU 100, and the detected vehicle speed V is referred to by the ECU 100 with a regular or irregular period.

Figure 2:
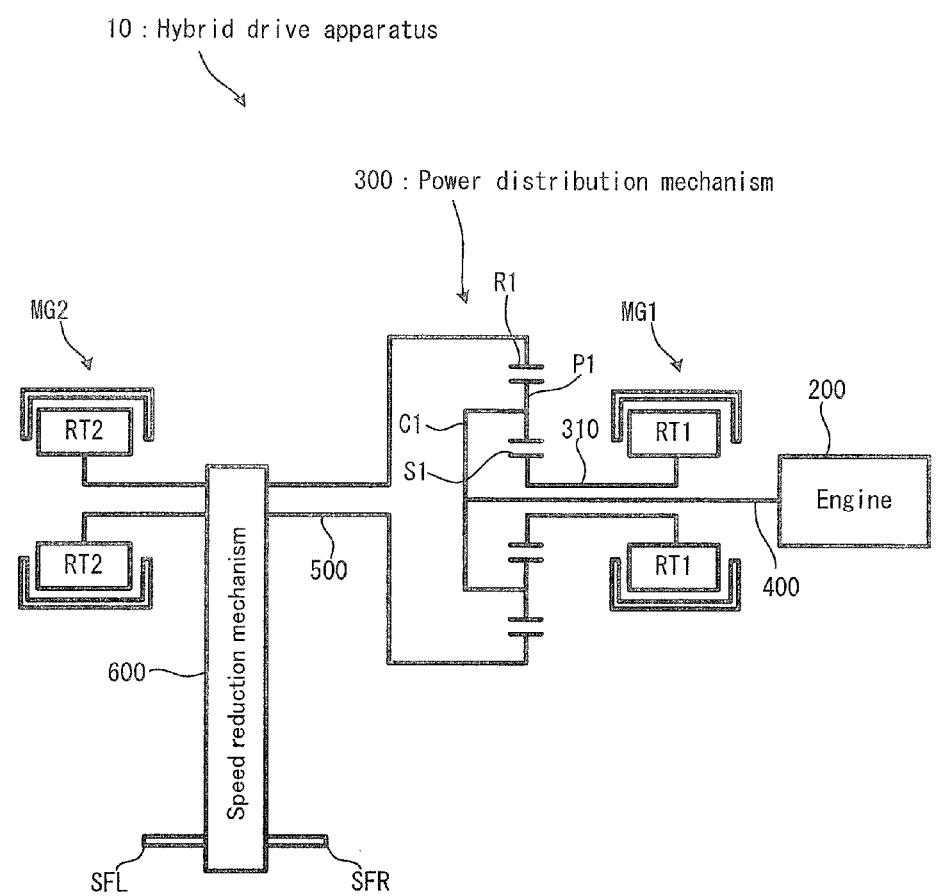
FIG. 2 is a schematic configuration diagram conceptually illustrating a configuration of a hybrid drive apparatus.

The hybrid drive apparatus 10 is a power unit which functions as a power train of the hybrid vehicle 1. Now, with reference to FIG. 2, a detailed configuration of the hybrid drive apparatus 10 will be explained. FIG. 2 is a schematic configuration diagram conceptually illustrating the configuration of the hybrid drive apparatus.

In FIG. 2, the hybrid drive apparatus 10 is provided mainly with an engine 200, a power distribution mechanism 300, the motor generator MG1 (hereinafter abbreviated to "MG1" as occasion demands), the motor generator MG2 (hereinafter abbreviated to "MG2" as occasion demands), an input shaft 400, a drive shaft 500, and a speed reduction mechanism 600.

Figure 3:
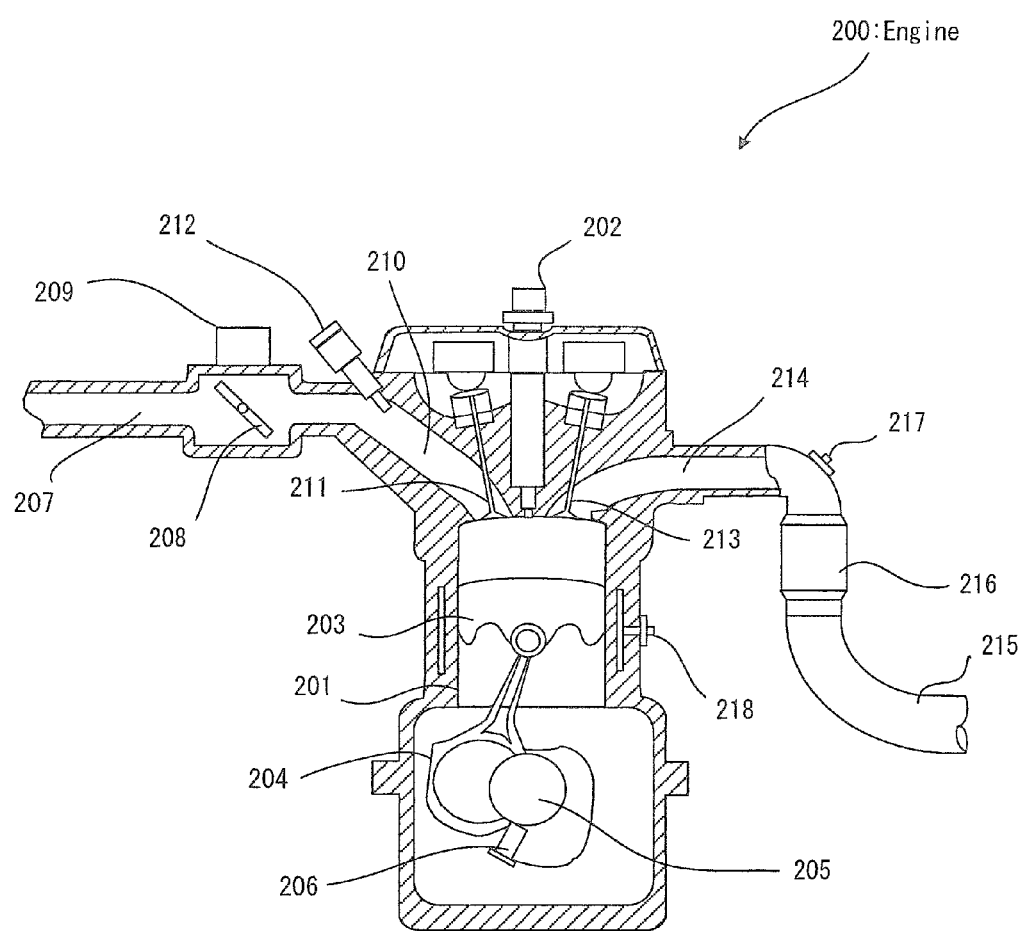
FIG. 3 is a schematic configuration diagram conceptually illustrating a configuration of an engine.

The engine 200 is a gasoline engine as one example of the "internal combustion engine" of the present invention. The engine 200 is configured to function as a main power source of the hybrid vehicle 10. Now, with reference to FIG. 3, a detailed configuration of the engine 200 will be explained. FIG. 3 is a schematic diagram illustrating a cross sectional configuration of the engine.

Incidentally, the "internal combustion engine" of the present invention conceptually includes an engine which has three or less cylinders and which is configured to extract a force generated when an air-fuel mixture containing various fuels such as, for example, gasoline, light oil or alcohol is burned in a combustion chamber within the cylinder(s), as a driving force through a physical or mechanical transmitting device such as, for example, a piston, a connecting rod, and a crankshaft, as occasion demands. As long as the concept is satisfied, the configuration of the internal combustion engine of the present invention is not limited to that of the engine 200 but may have various aspects.

Incidentally, even a four-or-more cylinder engine shall be included in the internal combustion engine of the present invention as long as it can be temporarily driven as the three-or-less cylinder engine due to cylinder deactivation or the like and is driven as the three-or-less cylinder engine during stop control described later.

Moreover, the engine 200 is an engine in which a plurality of cylinders 201 are aligned in a direction perpendicular to the paper; however, only one cylinder 201 will be explained in FIG. 3 because the individual cylinders 201 have the same configuration.

In FIG. 3, the engine 200 is configured to enable the air-fuel mixture to be burned via an ignition operation of an ignition apparatus 202 in which a spark plug (whose reference numeral is omitted) is partially exposed in a combustion chamber in the cylinder 201. The engine 200 is also configured to convert a reciprocating motion of a piston 203 caused by an explosive force due to the combustion, into a rotational motion of a crankshaft 205 through a connecting rod 204.

In the vicinity of the crankshaft 205, there is disposed a crank position sensor 206 configured to detect a rotational position of the crankshaft 205 (i.e. a crank angle). The crank position sensor 206 is electrically connected to the ECU 100 (not illustrated), and the ECU 100 is configured to calculate the number of engine revolutions NE of the engine 200 on the basis of a crank angle signal outputted from the crank position sensor 206.

In the engine 200, the air sucked from the exterior (or intake air) is supplied through an intake tube 207 and an intake port 210 to the inside of the cylinder 201 upon opening of an intake valve 211. Incidentally, the intake valve 211 herein is one example of the "intake valve" of the present invention.

On the other hand, the intake port 210 is provided with a not-illustrated pressure sensor. Moreover, a fuel injection valve of an injector 212 is exposed in the intake port 210, and the fuel injection valve is configured to inject fuel to the intake port 210. The fuel injected from the injector 212 is mixed with the intake air before or after the opening timing of the intake valve 211, thereby making the aforementioned air-fuel mixture.

The fuel is stored in a not-illustrated fuel tank and is supplied to the injector 212 through a not-illustrated delivery pipe by the operation of a not-illustrated feed pump. The air-fuel mixture burned in the cylinder 201 becomes an exhaust gas and is supplied to an exhaust tube 215 through an exhaust port 214 upon opening of an exhaust valve 213 which opens or closes in conjunction with the opening or closing of the intake valve 211.

On the other hand, on the upstream side of the intake port 210 in the intake tube 207, there is disposed a throttle valve 208 configured to adjust an intake air amount associated with the intake air supplied through a not-illustrated cleaner. The throttle valve 208 is one example of the "throttle valve" of the present invention and is configured such that a driving state thereof is controlled by a throttle valve motor 209 which is electrically connected to the ECU 100. Incidentally, the ECU 100 controls the throttle valve motor 209 basically to obtain a throttle opening degree according to the opening degree of an accelerator pedal which is not illustrated (i.e. the aforementioned accelerator opening degree Ta); however, the ECU 100 can also adjust the throttle opening degree without a driver's intention through the operation control of the throttle valve motor 209. In other words, the throttle valve 208 is configured as a kind of electronically-controlled throttle valve.

In the exhaust tube 215, a three-way catalyst 216 is disposed. The three-way catalyst 216 is a catalyst apparatus configured to reduce NOx (nitrogen oxide) in the exhaust gas emitted from the engine 200 and to oxidize CO (carbon monoxide) and HC (hydrocarbon) in the exhaust gas. Incidentally, a form which can be adopted by the catalyst apparatus is not limited to the three-way catalyst as described above. Instead of or in addition to the three-way catalyst, various catalysts such as, for example, a NSR catalyst (or NOx storage-reduction catalyst) or an oxidation catalyst may be disposed.

Moreover, in the exhaust tube 215, there is disposed an air-fuel ratio sensor 217 configured to detect an exhaust air-fuel ratio of the engine 200. Moreover, in a water jacket disposed in a cylinder block which accommodates the cylinder 201, there is disposed a water temperature sensor 218 for detecting a coolant temperature associated with a coolant (LLC) circulated and supplied to cool the engine 200. Each of the air-fuel ratio sensor 217 and the temperature sensor 218 is electrically connected to the ECU 100, and each of the detected air-fuel ratio and the detected coolant temperature is recognized by the ECU 100 with a regular or irregular detection period.

Back in FIG. 2, the motor generator MG1 is one example of the "motor" of the present invention, and is an electric motor generator having a power running function for converting electrical energy into kinetic energy and a regeneration function for converting kinetic energy into electrical energy. The motor generator MG2, as in the motor generator MG1, is an electric motor generator having the power running function for converting electrical energy into kinetic energy and the regeneration function for converting kinetic energy into electrical energy. Incidentally, the motor generators MG1 and MG2 may be configured, for example, as synchronous motor generators. For example, each of the motor generators MG1 and MG2 is provided with a rotor having a plurality of permanent magnets on an outer circumferential surface and a stator in which a three-phase coil for forming a rotating magnetic field is wound; however, each of the motor generators may have another configuration.

The power distribution mechanism 300 is provided with a sun gear S1 provided in a central portion thereof, a ring gear R1 provided concentrically on an outer circumference of the sun gear S1, a plurality of pinion gears P1 which are disposed between the sun gear S1 and the ring gear R1 and each of which revolves around the outer circumference of the sun gear S1 while rotating on its own axis, and a carrier C1 which supports a rotating shaft of each pinion gear.

Here, the sun gear S1 is coupled with a rotor RT1 of the MG1 through a sun gear shaft 310 and the number of revolutions thereof is equivalent to the number of revolutions Nmg1 of the MG1 (hereinafter referred to as "MG1 number-of-revolutions Nmg1" as occasion demands). The ring gear R1 is coupled with a rotor RT2 of the MG2 through a clutch 710, the drive shaft 500, and the speed reduction mechanism 600, and the number of revolutions thereof has an unambiguous relation with the number of revolutions Nmg2 of the MG2 (hereinafter referred to as "MG2 number-of-revolutions Nmg2" as occasion demands). Moreover, the carrier C1 is coupled with the input shaft 400 coupled with the aforementioned crankshaft 205 of the engine 200, and the number of revolutions thereof is equivalent to the number of engine revolutions NE of the engine 200. In the hybrid drive apparatus 10, each of the MG1 number-of-revolutions Nmg1 and the MG2 number-of-revolutions Nmg2 is detected with a regular period by a rotation sensor such as a resolver, and is transmitted to the ECU 100 with a regular or irregular period.

On the other hand, the drive shaft 500 is coupled with drive shafts SFR and SFL which drive a right front wheel FR and a left front wheel FL as driving wheels of the hybrid vehicle 1, respectively, via the speed reduction mechanism 600 which is a speed reducing apparatus including various reduction gears and differential gears. Therefore, motor torque Tmg2 supplied from the motor generator MG2 to the drive shaft 500 is transmitted to each drive shaft via the speed reduction mechanism 600, and a driving force from each driving wheel transmitted through each drive shaft is inputted to the motor generator MG2 via the speed reduction mechanism 600 and the drive shaft 500 in the same manner. Therefore, the MG2 number-of-revolutions Nmg2 has an unambiguous relation with the vehicle speed V of the hybrid vehicle 1.

The power distribution mechanism 300 is configured to distribute engine torque Te which is supplied from the engine 200 to the input shaft 400 through the crankshaft 205, to the sun gear S1 and the ring gear R1 at a predetermined ratio (a ratio according to a gear ratio between the gears) by the carrier C1 and the pinion gears P1, and is configured to divide the power of the engine 200 into two systems, under the above configuration.

<Apparatus Configuration>

Figure 4:
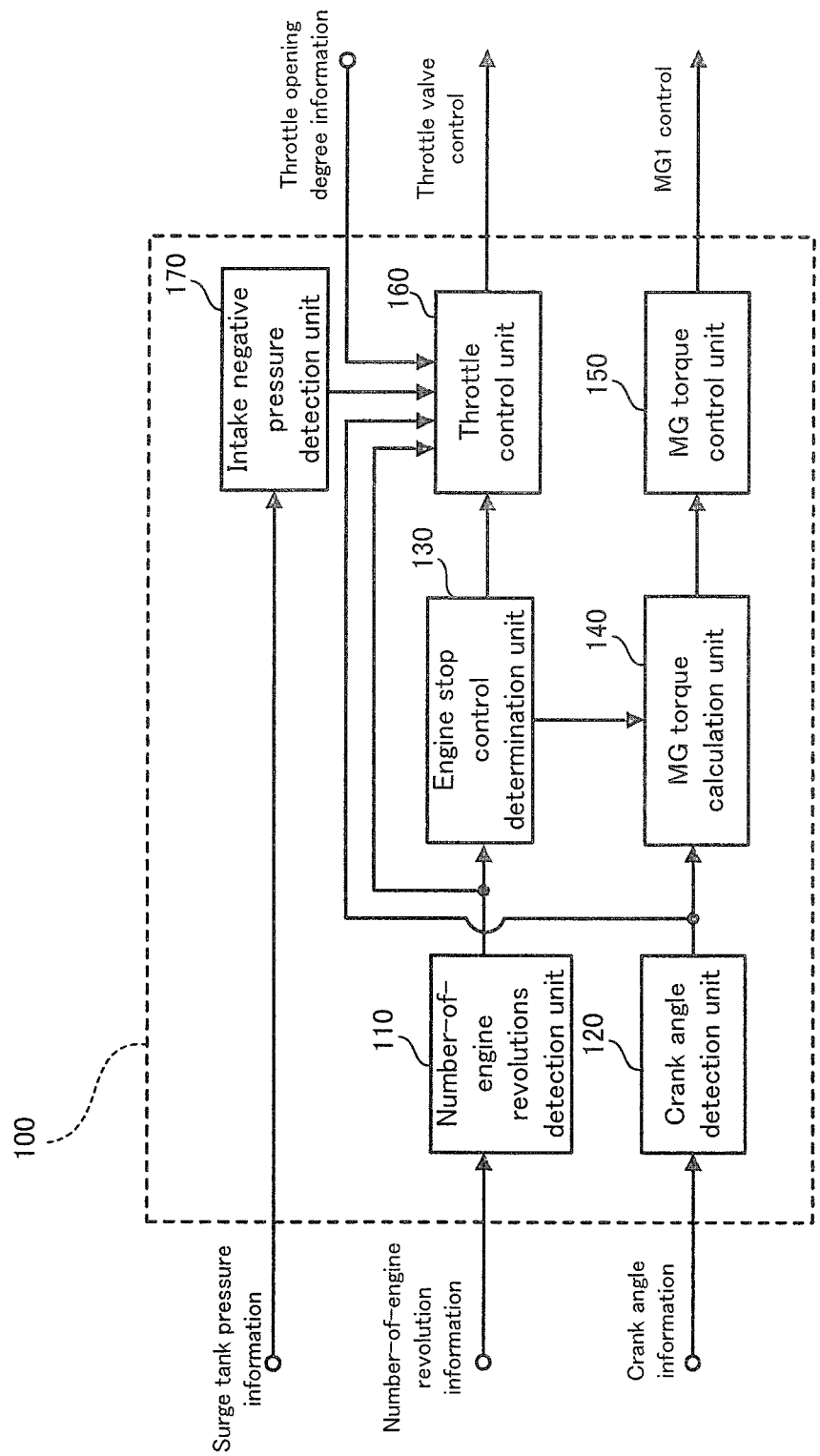
FIG. 4 is a block diagram illustrating a configuration of an ECU.

Next, a specific configuration of the ECU 100 which constitutes a main part of the stop control apparatus for the internal combustion engine in the embodiment will be explained with reference to FIG. 4. FIG. 4 is a block diagram illustrating the configuration of the ECU 100.

In FIG. 4, the ECU 100 in the embodiment is provided with a number-of-engine-revolutions detection unit 110, a crank angle detection unit 120, an engine stop control determination unit 130, a MG torque calculation unit 140, a MG torque control unit 150, a throttle control unit 160, and an intake negative pressure detection unit 170.

The number-of-engine-revolutions detection unit 110 detects the number of revolutions NE of the engine 200 on the basis of information about the crank angle which is obtained from, for example, the crank position sensor 206 (refer to FIG. 3). The number of revolutions NE of the engine 200 detected on the number-of-engine-revolutions detection unit 110 is outputted to the engine stop control determination unit 130.

The crank angle detection unit 120 detects the crank angle of the crankshaft 205 on the basis of the information about the crank angle which is obtained from, for example, the crank position sensor 206. The crank angle detected on the crank angle detection unit 120 is outputted to the MG torque calculation unit 140.

The engine stop control determination unit 130 performs various determinations in the stop control of the engine 200 on the basis of the number of revolutions NE of the engine 200 detected on the number-of-engine-revolutions detection unit 110. The engine stop control determination unit 130 has, for example, at least one threshold value for the number of revolutions NE of the engine 200 in order to perform the engine stop control, and determines whether or not to perform various controls in the engine stop control depending on whether or not the detected number of revolutions NE exceeds the threshold value. The engine stop control determination unit 130 controls each of the MG torque calculation unit 140 and the throttle control unit 160 if determining to perform the engine stop control.

The MG torque calculation unit 140 determines torque to be outputted from the MG1. The MG torque calculation unit 140 calculates reducing torque for reducing the number of revolutions of the engine 200 in the engine stop control, and adjusting torque for adjusting the position of the crank angle. Here, in particular, the aforementioned adjusting torque is calculated by using the crank angle which is obtained from the crank angle detection unit 120. The MG torque calculation unit 140 stores therein, for example, a map for deriving the adjusting torque from the crank angle. A value calculated on the MG torque calculation unit 140 is outputted to the MG torque control unit 150.

The MG torque control unit 150 is one example of the "motor controlling device" of the present invention. The MG torque control unit 150 controls the motor generator MG1 to output the torque which is calculated on the MG torque calculation unit 140.

The throttle control unit 160 is one example of the "throttle valve controlling device" of the present invention. The throttle control unit 160 drives the throttle valve motor 209 (refer to FIG. 3), thereby controlling the opening degree of the throttle valve 208. The throttle control unit 160 in the embodiment particularly sets the throttle valve 208 to have a predetermined opening degree which is set in advance, upon engine stop control. The operation upon engine stop control will be detailed later.

The intake negative pressure detection unit 170 detects the magnitude of negative pressure in the intake port, for example, from pressure of a surge tank or the like in the intake port 210. The detected intake negative pressure is outputted to the throttle valve controlling device 160 and used for opening degree control of the throttle valve.

The ECU 100 which includes the aforementioned parts is an electronic control unit which is integrally configured, and all the operations related to the aforementioned parts are configured to be performed by the ECU 100. The physical, mechanical, and electrical configurations of the aforementioned parts in the present invention are not limited to this example. For example, each of the parts may be configured as various computer systems, such as a plurality of ECUs, various processing units, various controllers, or micro computer apparatuses.

Figure 5:
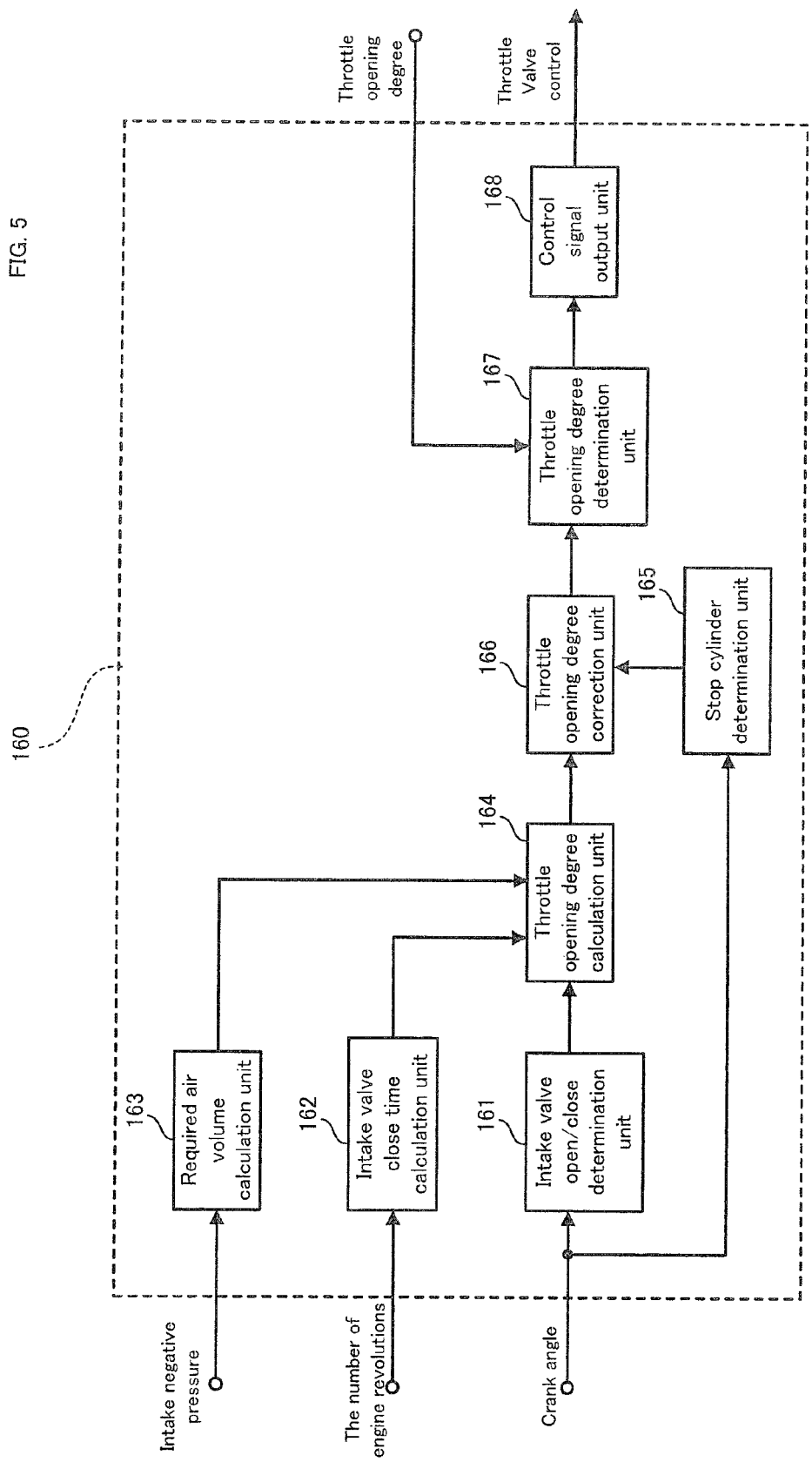
FIG. 5 is a block diagram illustrating a configuration of a throttle control unit.

Next, a specific configuration of the throttle valve controlling device of the ECU 100 will be explained with reference to FIG. 5. FIG. 5 is a block diagram illustrating a configuration of the throttle control unit.

In FIG. 5, the throttle valve controlling device in the embodiment is provided with an intake valve open/close determination unit 161, an intake valve close time calculation unit 162, a required air volume calculation unit 163, a throttle opening degree calculation unit 164, a stop cylinder determination unit 165, a throttle opening degree correction unit 166, a throttle opening degree determination unit 167, and a control signal output unit 168.

The intake valve open/close determination unit 161 is one example of the "determining device" of the present invention. The intake valve open/close determination unit 161 determines whether or not the intake valve 211 is closed in all the cylinders of the engine 200, for example, on the basis of the information about the crank angle which is obtained from the crank position sensor 206. The determination result of the intake valve open/close determination unit 161 is outputted to the throttle opening degree calculation unit 164.

The intake valve close time calculation unit 162 calculates a period in which the intake valve 211 is closed in all the cylinders of the engine 200, on the basis of the number of revolutions NE of the engine 200 which is detected on the number-of-engine-revolutions detection unit 110. The period calculated on the intake valve close time calculation unit 162 is outputted to the throttle opening degree calculation unit 164.

The required air volume calculation unit 163 calculates an air volume required to make the intake negative pressure zero, on the basis of the intake negative pressure which is detected on the intake negative pressure detection unit 170. In other words, it is calculated how much air is introduced to the intake port 210 to solve the negative pressure. The required air volume which is calculated on the required air volume calculation unit 163 is outputted to the throttle opening degree calculation unit 164.

The throttle opening degree calculation unit 164 calculates a target opening degree in the opening degree control of the throttle valve 208. Incidentally, the target opening degree herein is one example of the "predetermined opening degree" of the present invention and is calculated as a value which allows the intake negative pressures to be solved. Specifically, the throttle opening degree calculation unit 164 calculates the target opening degree, on the basis of the period which is calculated on the intake valve close time calculation unit 162 and the required air volume which is calculated on the required air volume calculation unit 163, at a stage at which it is determined on the intake valve open/close determination unit 161 that the intake valve 211 is closed in all the cylinders.

The stop cylinder determination unit 165 determines the cylinder 201 which is about to stop the crank angle in the compression stroke, for example, on the basis of the information about the crank angle which is obtained from the crank position sensor 206. The determination result of the stop cylinder determination unit 165 is outputted to the throttle opening degree correction unit 166.

The throttle opening degree correction unit 166 corrects the target opening degree which is calculated on the throttle opening degree calculation unit 164, on the basis of the determination result of the stop cylinder determination unit 165. More specifically, the throttle opening degree correction unit 166 performs the correction by applying a coefficient according to the determination result of the stop cylinder determination unit 165, to the target opening degree which is calculated on the throttle opening degree calculation unit 164.

The throttle opening degree determination unit 167 determines whether or not the actual opening degree of the throttle valve 208 exceeds the target opening degree after the correction. The throttle opening degree determination unit 167 stops the control of the throttle opening degree if the actual opening degree of the throttle valve 208 exceeds the target opening degree after the correction.

The control signal output unit 168 performs such control that the opening degree of the throttle valve 208 is the target opening degree after the correction, if it is not determined on the throttle opening degree determination unit 167 to stop the control of the throttle opening degree.

Incidentally, the operation of the throttle control unit 160 which includes the aforementioned parts is controlled by the engine stop control determination unit 130 of the ECU 100 as described above. In other words, the operation of each of the parts of the throttle control unit 160 is started if it is determined on the engine stop control determination unit 130 to control the throttle valve 211.

<Operation Explanation>

Next, the operation of the stop control apparatus for the internal combustion engine in the embodiment will be explained.

Figure 6:
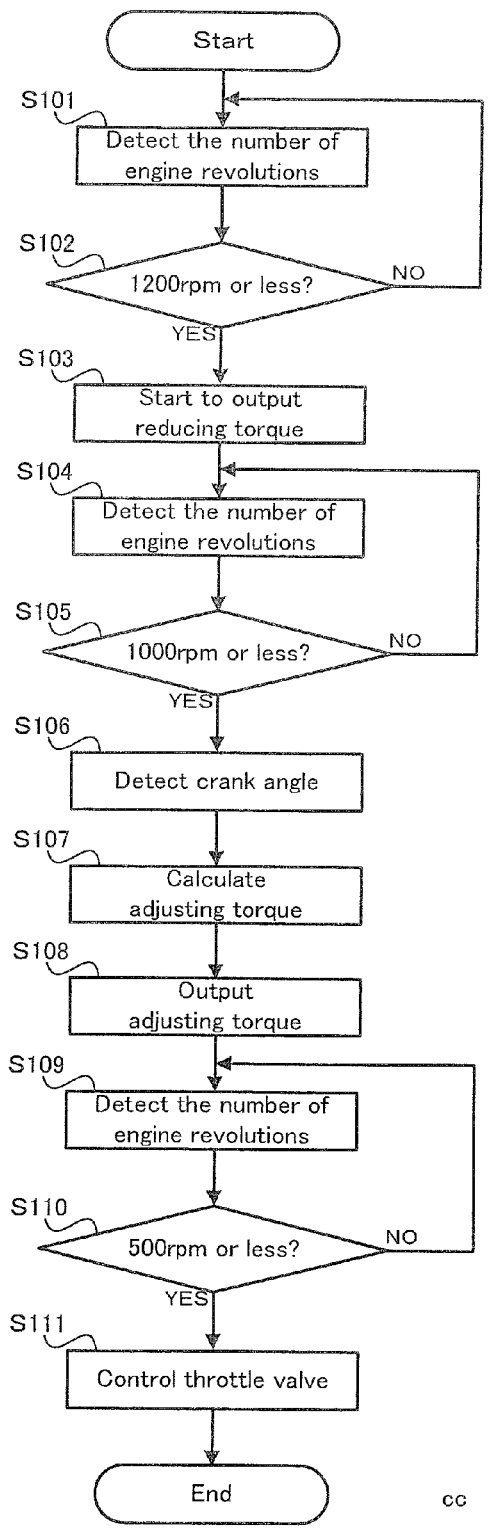
FIG. 6 is a flowchart illustrating the operation of a stop control apparatus for an internal combustion engine in an embodiment.
Figure 7:
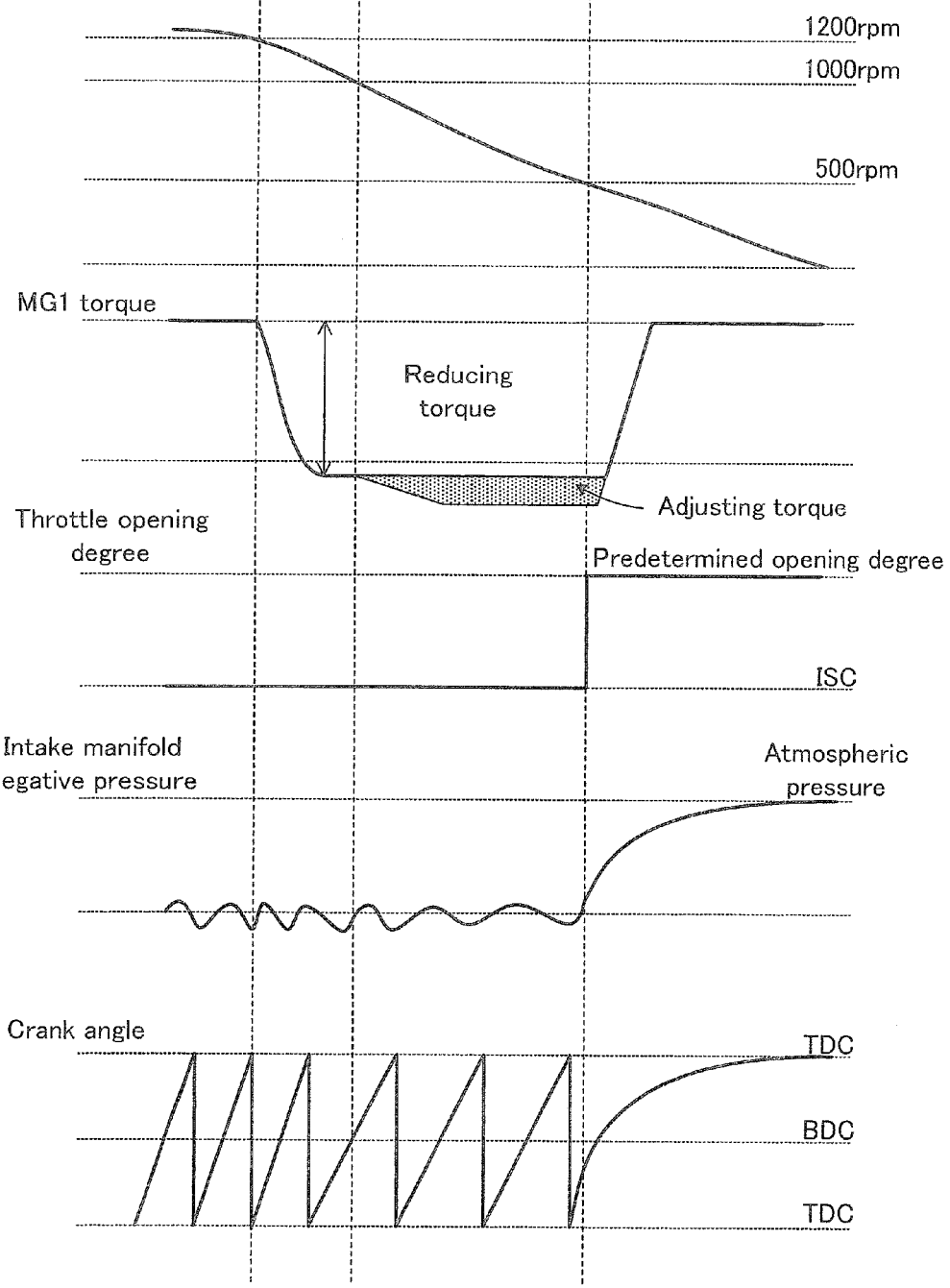
FIG. 7 is a chart illustrating changes in various parameters in operation of the stop control apparatus for the internal combustion engine in the embodiment.

Firstly, out of the engine stop control which is performed by the stop control apparatus for the internal combustion engine in the embodiment, control which is performed before the control of the opening degree of the throttle valve 211 will be explained with reference to FIG. 6 to FIG. 8. FIG. 6 is a flowchart illustrating the operation of the stop control apparatus for the internal combustion engine in the embodiment. FIG. 7 is a chart illustrating changes in various parameters in operation of the stop control apparatus for the internal combustion engine in the embodiment.

In FIG. 6 and FIG. 7, in operation of the stop control apparatus for the internal combustion engine in the embodiment, firstly, the number of revolutions NE of the engine 200 is detected on the number-of-engine-revolutions detection unit 110 (step S101). If the number of revolutions NE of the engine 200 is detected, it is determined on the engine stop control determination unit 130 whether or not the detected value is 1200 rpm or less (step S102). Incidentally, the value of 1200 rpm herein is a threshold value for determining whether or not to start the engine stop control, and is stored in advance in the engine stop control determination unit 130.

If it is determined that the detected value is 1200 rpm or less (the step S102: YES), the reducing torque to be outputted from the MG1 is calculated on the MG torque calculation unit 140, and the MG1 is controlled to output the calculated reducing torque by the MG torque control unit 150 (step S103).

If the reducing torque cannot be sufficiently outputted from the MG1, for example, due to Win limit or the like in the battery 12, it is possible to compensate for the output shortage of the MG1 by temporally reducing the opening degree of the throttle valve 208 before the output of the reducing torque and producing the braking effect due to the intake negative pressure.

Then, the number of revolutions NE of the engine 200 is detected again on the number-of-engine-revolutions detection unit 110 (step S104). If the number of revolutions NE of the engine 200 is detected, it is determined on the engine stop control determination unit 130 whether or not the detected value is 1000 rpm or less (step S105). Incidentally, the value of 1000 rpm herein is a threshold value for determining whether or not to start the output of the adjusting torque for adjusting the crank angle, and is stored in advance in the engine stop control determination unit 130.

If it is determined that the detected value is 1000 rpm or less (the step S105: YES), firstly, the value of the crank angle at that time point is detected on the crank angle detection unit 120 (step S106). Then, the adjusting torque to be outputted from the MG1 is calculated by the MG torque calculation unit 140 on the basis of the detected value of the crank angle (step S107).

Now, a specific method of calculating the adjusting torque will be explained with reference to FIG. 8. FIG. 8 is a map for calculating the adjusting torque from the crank angle. Incidentally, the map in FIG. 8 illustrates a torque value for controlling the crank angle after the engine stop to be about 120 deg to 150 deg, which is immediately before the top dead center.

Figure 8:
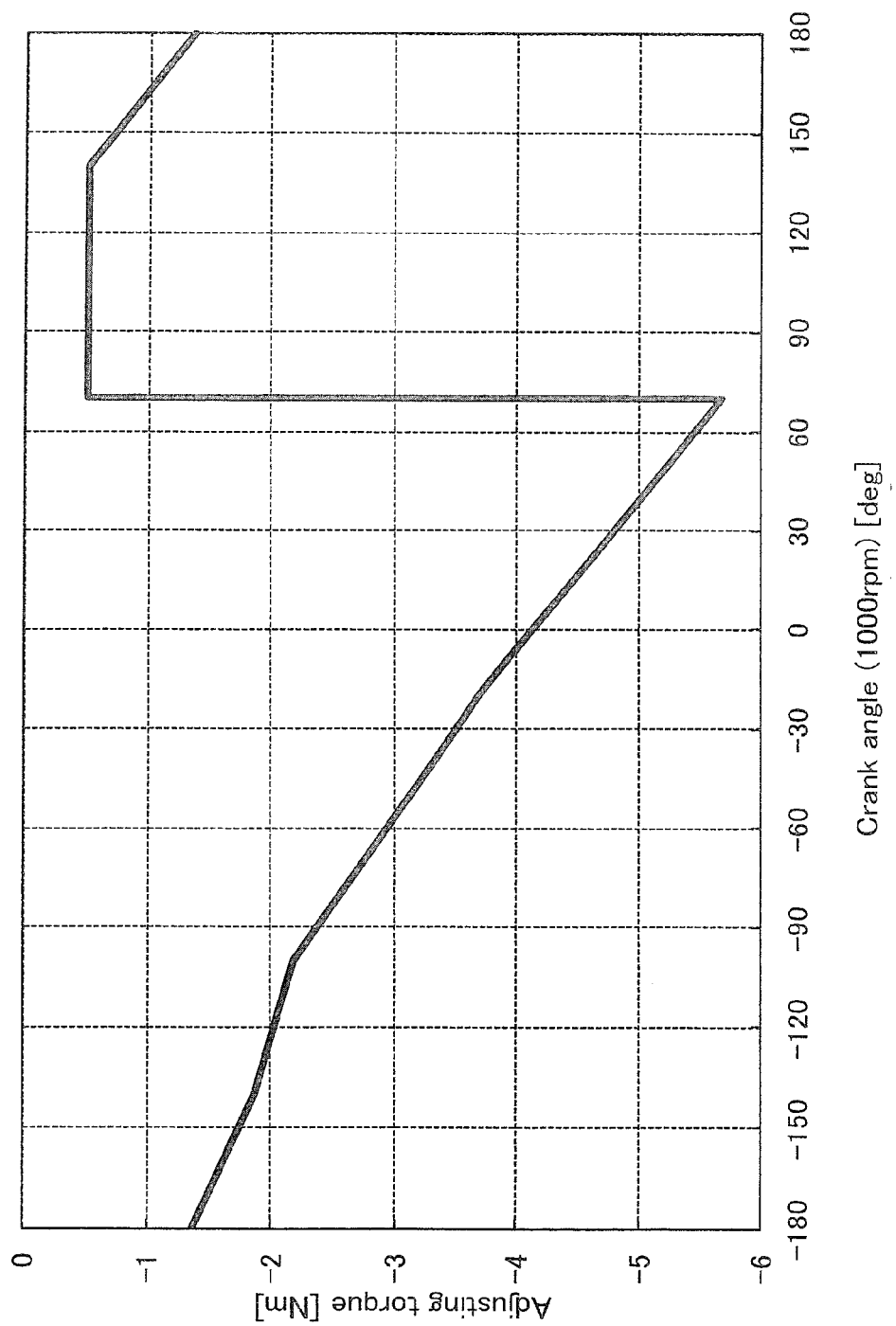
FIG. 8 is a map for calculating adjusting torque from a crank angle.

By using the map as illustrated in FIG. 8, the value of the adjusting torque to be outputted can be unambiguously determined from the value of the crank angle when the number of revolutions NE of the engine 200 is 1000 rpm. The map as described above can be prepared, for example, by repeating a test for studying what type of torque is to be outputted to set the crank angle after the engine stop at a desired position.

Back in FIG. 6 and FIG. 7, if the adjusting torque is calculated, the MG1 is controlled to output the calculated adjusting torque, by the MG torque control unit 150 (step S108). The adjusting torque is outputted, as illustrated in a hatched portion in FIG. 7, in a form of being added to the reducing torque which has been outputted by that time.

Then, the number of revolutions NE of the engine 200 is detected again on the number-of-engine-revolutions detection unit 110 (step S109). If the number of revolutions NE of the engine 200 is detected, it is determined on the engine stop control determination unit 130 whether or not the detected value is 500 rpm or less (step S110). Incidentally, the value of 500 rpm herein is a threshold value for determining whether or not to perform the opening degree control of the throttle valve 208, and is stored in advance in the engine stop control determination unit 130.

It is also possible to suppress driving noise caused by damper resonance, by bringing the threshold value herein close to a resonance band of a damper (e.g. 350 rpm). Specifically, if the resonance band of the damper is overlapped in the compression stroke, the driving noise caused by the damper resonance deteriorates due to compression reaction force. In contrast, if a threshold value for starting the control of the throttle opening degree is set to be the resonance band of the damper, it is possible to effectively suppress the driving noise, because the resonance band of the damper can be passed through in the intake stroke immediately before the engine stop.

If it is determined on the engine stop control determination unit 130 that the detected value is 500 rpm or less (the step S110: YES), the control of the throttle opening degree is started by the throttle control unit 160 (step S111).

Figure 9:
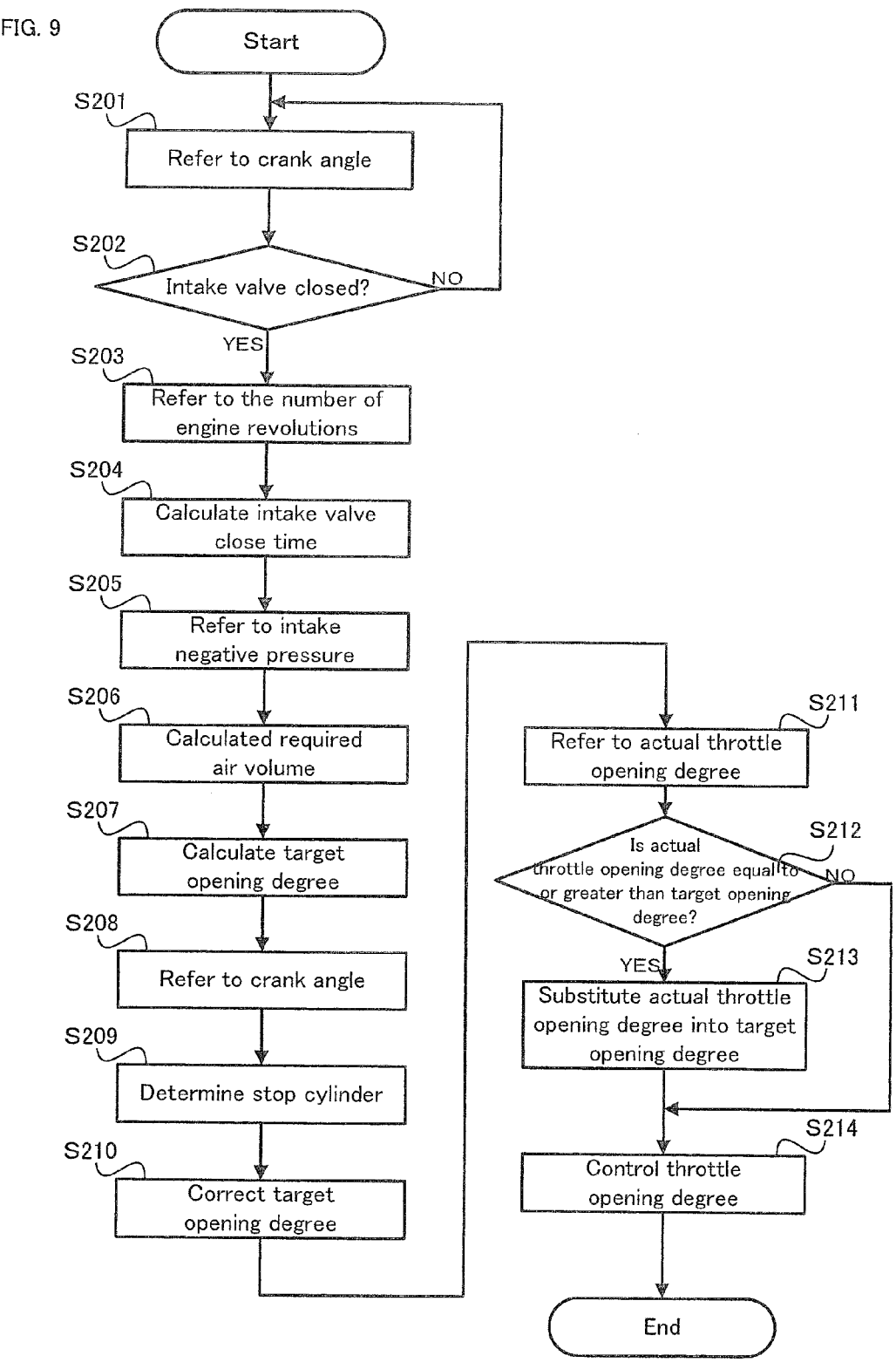
FIG. 9 is a flowchart illustrating the operation of a throttle control unit.

Hereinafter, the control of the throttle opening degree by the throttle control unit 160 will be explained with reference to FIG. 9. FIG. 9 is a flowchart illustrating the operation of the throttle control unit.

In FIG. 9, if the control of the throttle opening degree by the throttle control unit 160 is started, firstly, the crank angle is referred to on the intake valve open/close determination unit 161 (step S201), and it is determined whether or not the intake valve 211 is closed in all the cylinders 201 of the engine 200 (step S202). The subsequent processing is performed only when the intake valve 211 is closed in all the cylinders 201 of the engine 200. In other words, the control of the throttle opening degree is performed only when the intake valve 211 is closed in all the cylinders 201 of the engine 200.

Figure 10:
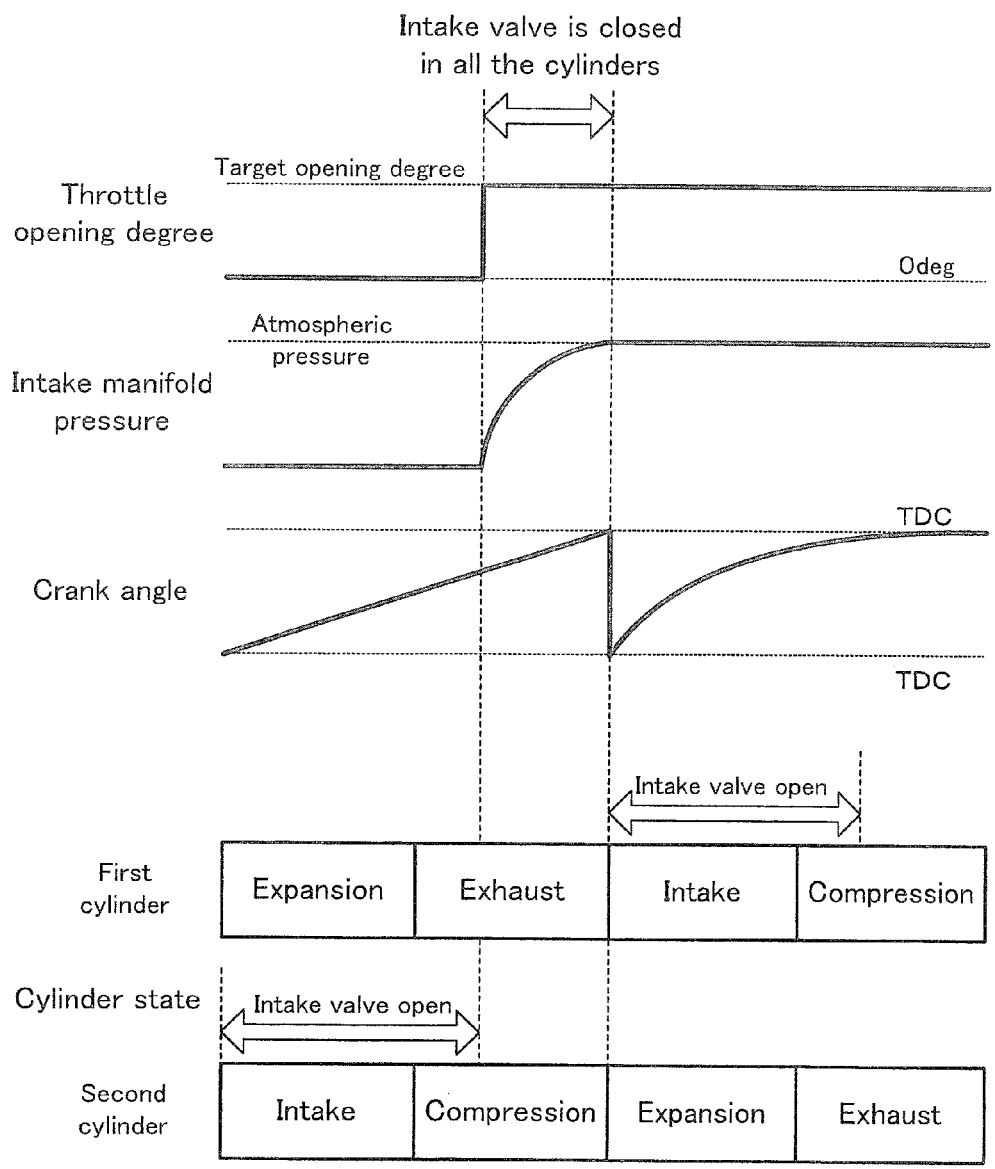
FIG. 10 is a chart illustrating relations between opening/closing of an intake valve and various parameters.

Now, the effect of controlling the throttle opening degree when the intake valve 211 is closed in all the cylinders 201 of the engine 200 will be explained with reference to FIG. 10. FIG. 10 is a chart illustrating relations between opening/closing of the intake valve and various parameters.

In FIG. 10, it is assumed that the engine 200 is provided with two cylinders, which are a first cylinder and a second cylinder. In this case, when the first cylinder is in the intake stroke, the second cylinder is in an expansion stroke. When the first cylinder is in the compression stroke, the second cylinder is in an exhaust stroke. When the first cylinder is in the expansion stroke, the second cylinder is in the intake stroke. When the first cylinder is in the exhaust stroke, the second stroke is in the compression stroke. Thus, in the first cylinder and the second cylinder, the opening/closing of the intake valve 211 is performed in different timing.

Here, particularly in the embodiment, as described above, the control of the throttle opening degree is performed in the period in which the intake valve 211 is closed in any of the two cylinders. Thus, in the example illustrated in FIG. 10, the throttle opening degree is controlled after the compression stroke is started in the second cylinder and the intake valve 211 is closed. By this, the air is introduced to the intake port 210 through the throttle valve 208, and the intake negative pressure is solved at the start of the intake stroke in the first cylinder. This reduces the braking effect of the piston 203 caused by the intake negative pressure in the intake stroke in the first cylinder, and increases the braking effect caused by the compression pressure (i.e. compression torque) in the subsequent compression stroke. This makes it easy to stop the crank angle immediately before the top dead center.

Incidentally, here, the opening degree of the throttle valve 208 is controlled at the same time as when the intake valve 211 in the second cylinder is closed. The aforementioned effect, however, is properly obtained in any period in which the intake valve 211 is closed in all the cylinders 201 of the engine 200. Incidentally, a period in which the air is introduced to the intake port 210 through the throttle valve 208 can be lengthened if the opening degree of the throttle valve 208 is controlled at an earlier stage. Thus, even if the throttle valve 208 has a small opening degree after the control, the intake negative pressure can be certainly solved. If the opening degree of the throttle valve 208 after the control can be reduced, a load of a member for controlling the throttle valve 208, such as the throttle valve motor 209, can be reduced. Thus, a reduction in service life of the throttle valve 208 can be suppressed.

Back in FIG. 9, if the intake valve 211 is closed in all the cylinders 201 of the engine 200 (the step S202: YES), the number of engine revolutions NE is referred to on the intake valve close time calculation unit 162 (step S203), and the period in which the intake valve 211 is closed in all the cylinders 201 of the engine 200 is calculated (step S204).

Moreover, the intake negative pressure is referred to on the required air volume calculation unit 163 (step S205), and the air volume required to make the intake negative pressure zero is calculated (step S206).

If the close time of the intake valve 211 and the required air volume are calculated, the target opening degree of the throttle valve 208 is calculated on the throttle opening degree calculation unit 164 (step S207). The throttle opening degree calculation unit 164 calculates the target opening degree, as the opening degree of the throttle valve 208 which enables the required air volume to be introduced to the intake port 210, within the close time of the intake valve 211.

Figure 11:
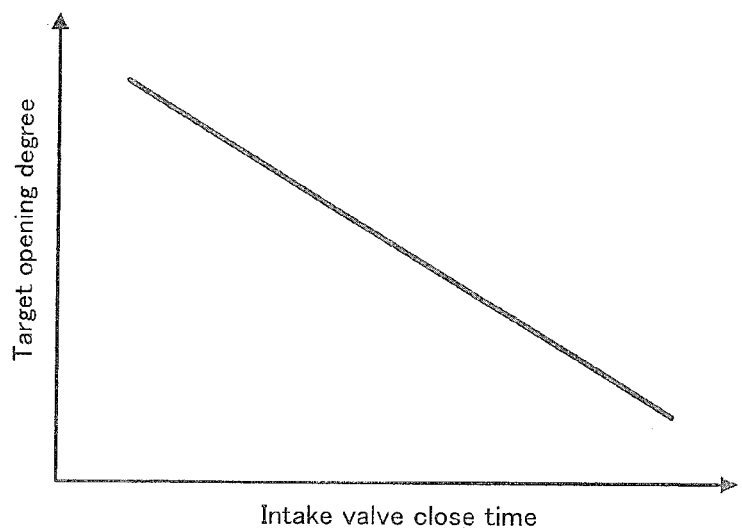
FIG. 11 is a graph illustrating a relation between an intake valve close time and a target opening degree.
Figure 12:
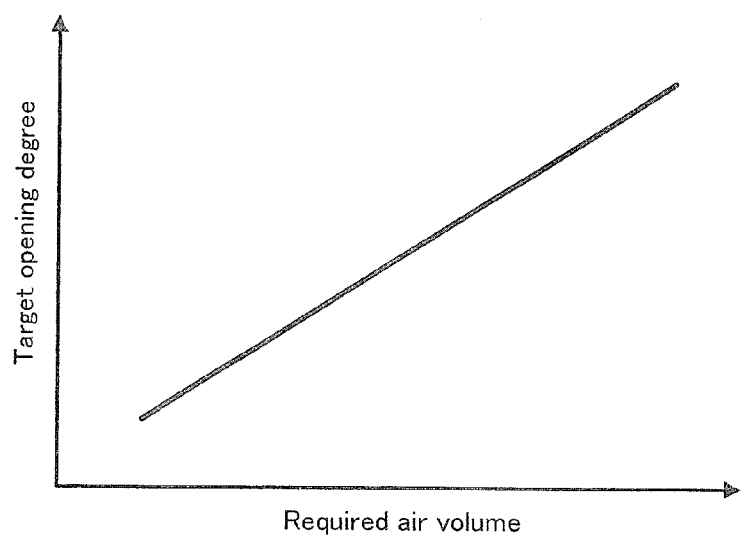
FIG. 12 is a graph illustrating a relation between a required air volume and the target opening degree.

Now, a method of calculating the target opening degree by the throttle opening degree calculation unit 164 will be specifically explained with reference to FIG. 11 and FIG. 12. FIG. 11 is a graph illustrating a relation between the intake valve close time and the target opening degree. FIG. 12 is a graph illustrating a relation between the required air volume and the target opening degree.

As illustrated in FIG. 11 and FIG. 12, the throttle opening degree calculation unit 164 stores therein a map which indicates the relation between the close time of the intake valve 211 and target opening degree and a map which indicates the relation between the required air volume and the target opening degree in advance. The throttle opening degree calculation unit 164 calculates the target opening degree by mapping the close time of the intake valve 211 and the required air volume which are calculated.

In FIG. 11, the target opening degree is set as a value which is inversely proportional to the close time of the intake valve 211. Thus, as the calculated close time of the intake valve 211 increases, the target opening degree is calculated as a smaller value. If the target opening degree is calculated as described above, even if a period from the control of the throttle opening degree to the start of the next intake stroke is short, the intake negative pressure can be effectively reduced by increasing the throttle opening degree upon control. Moreover, if the period from the control of the throttle opening degree to the start of the next intake stroke is long, a load on the throttle valve 208 is further reduced by reducing the throttle opening degree upon control.

In FIG. 12, the target opening degree is set as a value which is proportional to the required air volume. Thus, as the calculated required air volume increases, the target opening degree is calculated as a smaller value. In cases where the target opening degree is calculated as described above, if the intake negative pressure is high, the throttle opening degree is increased upon control and the effect of reducing the intake negative pressure is increased. If the intake negative pressure is low, the throttle opening degree is reduced upon control and the load on the throttle valve 208 is further reduced.

Back in FIG. 9, if the target opening degree is calculated, the crank angle is referred to on the stop cylinder determination unit 165 (step S208), and it is determined which cylinder 201 of the engine 200 is to be stopped in the compression stroke (step S209).

If the cylinder 201 to be stopped in the compression stroke is determined, the target opening degree calculated on the throttle opening degree calculation unit 164 is corrected on the throttle opening degree correction unit 166. The throttle opening degree correction unit 166 corrects the target opening degree on the basis of the determination result of the stop cylinder determination unit 165.

Figure 13:
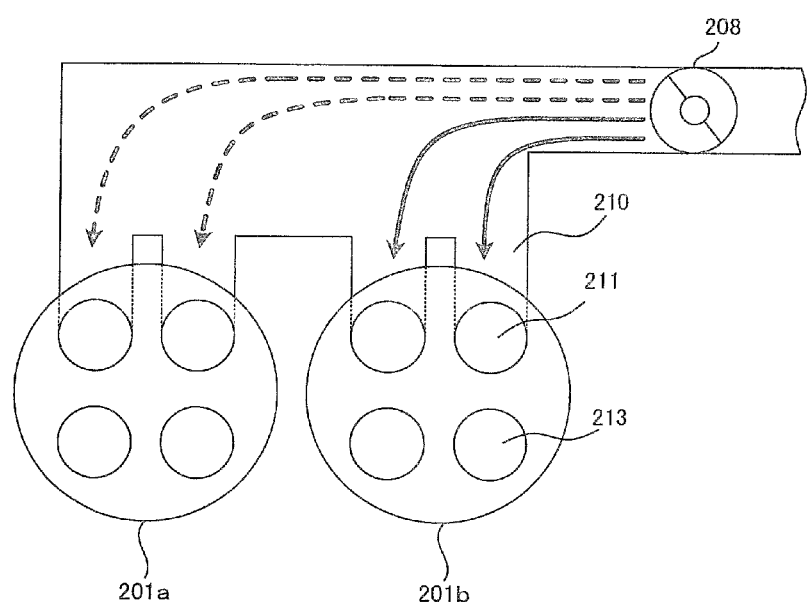
FIG. 13 is a schematic diagram illustrating a flow of an intake air with respect to cylinders having different distances from a throttle valve.

Hereinafter, the correction of the target opening degree by the throttle opening degree correction unit 166 will be explained in detail with reference to FIG. 13. FIG. 13 is a schematic diagram illustrating a flow of the intake air with respect to cylinders having different distances from the throttle valve.

As illustrated in FIG. 13, a cylinder 201a which is more distant from the throttle valve 208 has a longer path of the air which is introduced through the throttle valve 208. Thus, in comparison with a cylinder 201b which is less distant from the throttle valve 208, a period from the control of the throttle opening degree to when the intake pressure near the intake valve 211 becomes low is lengthened. Thus, if the cylinder 201a which is more distant from the throttle valve 208 is to be stopped in the compression stroke, it is required to further increase the effect of reducing the intake negative pressure.

In contrast, in the embodiment, the target opening degree is corrected to be larger with increasing the distance from the throttle valve 208 to the cylinder to be stopped. Specifically, the value of the correction coefficient which is applied to the target opening degree is increased. Thus, in the case of stopping the more distant cylinder 201a in which the intake negative pressure is hardly reduced, the throttle opening degree upon control is increased, and the effect of reducing the intake negative pressure is increased. In the case of stopping the less distant cylinder 201b in which the intake negative pressure is easily reduced, the throttle opening degree is corrected to be smaller (or is not corrected to be larger). Specifically, the value of the correction coefficient which is applied to the target opening degree is reduced. Thus, the throttle opening degree upon control is increased, and the load on the throttle valve 208 is further reduced.

Back in FIG. 9, if the target opening degree is corrected, the actual opening degree of the throttle valve 208 is referred to on the throttle opening degree determination unit 167 (step S211), and it is determined whether or not the actual opening degree of the throttle valve 208 exceeds the target opening degree after the correction (step S212).

Here, if the actual opening degree of the throttle valve 208 exceeds the target opening degree after the correction (the step S212: YES), the actual opening degree of the throttle valve 208 is substituted into the target opening degree (step S213). Thus, the final target opening degree is the actual opening degree of the throttle valve 208. Thus, even if the throttle opening degree is controlled, the throttle opening degree does not change. On the other hand, if the actual opening degree of the throttle valve 208 does not exceed the target opening degree after the correction (the step S212: NO), the processing in the step S213 is omitted. In other words, the final target opening degree is the target opening degree after the correction.

Figure 14:
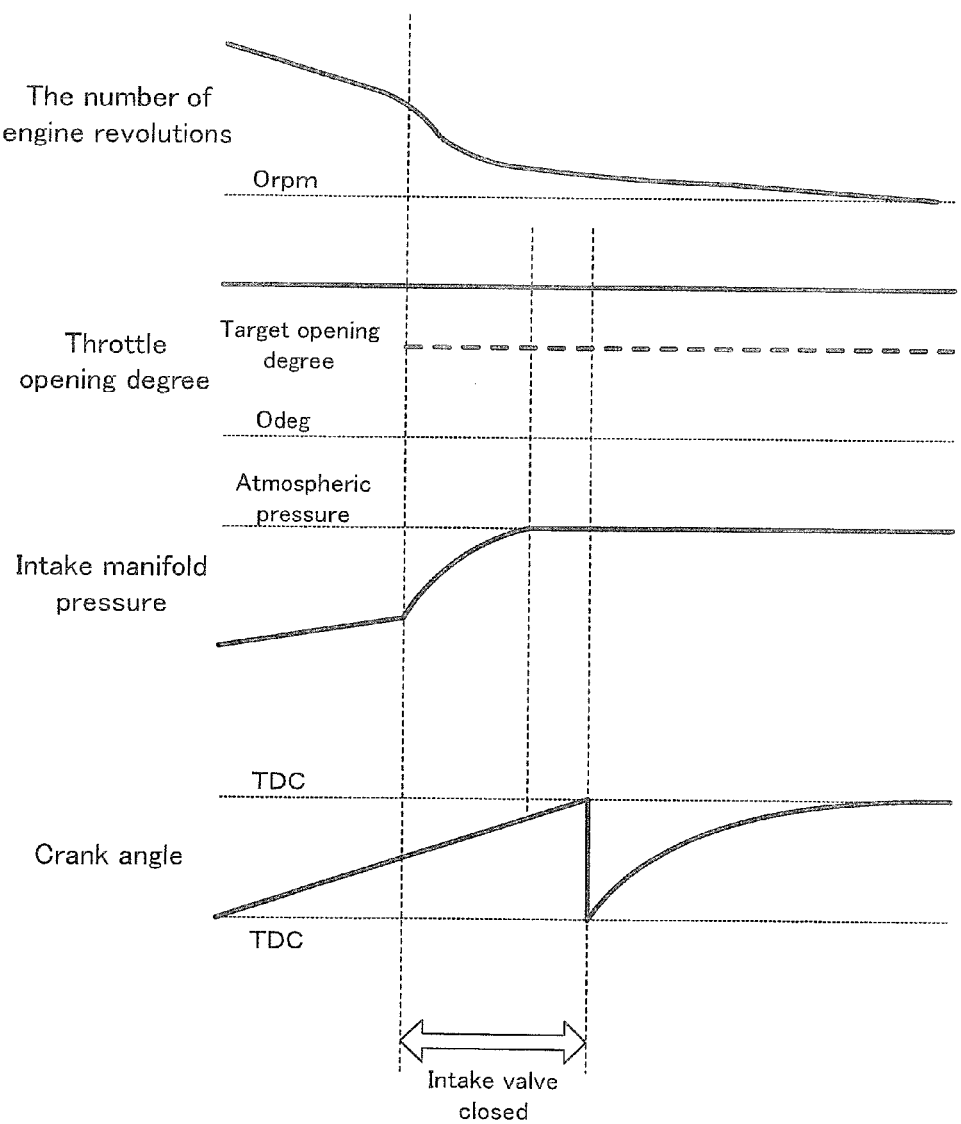
FIG. 14 is a chart illustrating changes in various parameters in cases where a throttle opening degree before control is greater than the target opening degree.

Hereinafter, the effect of the determination on the throttle opening degree determination unit 167 will be specifically explained with reference to FIG. 14. FIG. 14 is a chart illustrating changes in various parameters in cases where the throttle opening degree before the control is greater than the target opening degree.

As illustrated in FIG. 14, if the throttle opening degree before the control is greater than the target opening degree, the intake negative pressure is solved even without controlling the throttle opening degree. Thus, if the actual opening degree of the throttle valve 208 is substituted into the target opening degree as described above (in other words, if the change to the calculated target opening degree is stopped), it is possible to prevent that the opening degree of the throttle valve 208 is unnecessarily changed. Thus, the load on the throttle valve 208 can be reduced.

Back in FIG. 9, if the final target opening is determined, a control signal for setting the opening degree of the throttle valve 208 to be the target opening degree is outputted from the control signal output unit 168 (step S214). By this, the air is actually introduced to the intake port 210 through the throttle valve 208, and the effect of the embodiment described above is exerted.

As explained above, according to the stop control apparatus for the internal combustion engine in the embodiment, the intake negative pressure can be solved by controlling the opening degree of the throttle valve 208. Therefore, even in the engine 200 having three or less cylinders, the crank angle can be preferably controlled when the engine stops.

The present invention is not limited to the aforementioned embodiment, but various changes may be made, if desired, without departing from the essence or spirit of the invention which can be read from the claims and the entire specification. A control stop apparatus for an internal combustion engine, which involve such changes, is also intended to be within the technical scope of the present invention.

DESCRIPTION OF REFERENCE CODES

1 hybrid vehicle
10 hybrid drive apparatus
11 PCU
12 battery
13 accelerator opening sensor
14 vehicle speed sensor
100 ECU
110 number-of-engine-revolutions detection unit
120 crank angle detection unit
130 engine stop control determination unit
140 MG torque calculation unit
150 MG torque control unit
160 throttle control unit
170 intake negative pressure detection unit
161 intake valve open/close determination unit
162 intake valve close time calculation unit
163 required air volume calculation unit
164 throttle opening degree calculation unit
165 stop cylinder determination unit
166 throttle opening degree correction unit
167 throttle opening degree determination unit
168 control signal output unit
200 engine
201 cylinder
203 piston
205 crankshaft
206 crank position sensor
208 throttle valve
209 throttle valve motor
210 intake port
211 intake valve
212 injector
213 exhaust valve
214 exhaust port
300 power distribution mechanism
500 drive shaft
600 speed reduction mechanism
MG1, MG2 motor generator

The invention claimed is:

1. A stop control apparatus for an internal combustion engine which is configured to perform stop control of a three-or-less cylinder internal combustion engine, said stop control apparatus comprising:
   a determining device which is configured to determine a compression stroke immediately before the internal combustion engine stops; and
   a throttle valve controlling device which is configured to control an opening degree of a throttle valve to be a predetermined opening degree while an intake valve is closed in all cylinders, in the compression stroke immediately before the internal combustion engine stops, which is determined by said determining device, wherein
   said throttle valve controlling device controls the opening degree of the throttle valve to be the predetermined opening degree in the case of a crank angle at which the intake valve is closed in all the cylinders.

2. The stop control apparatus for the internal combustion engine according to claim 1, wherein said throttle valve controlling device increases the predetermined opening degree as the number of revolutions of the internal combustion engine increases when the opening degree of the throttle valve is the predetermined opening degree.

3. The stop control apparatus for the internal combustion engine according to claim 1, wherein said throttle valve controlling device increases the predetermined opening degree as negative pressure of an intake path increases when the opening degree of the throttle valve is the predetermined opening degree.

4. The stop control apparatus for the internal combustion engine according to claim 1, wherein said throttle valve controlling device increases the predetermined opening degree with increasing a distance from the throttle valve to a cylinder to be stopped in the compression stroke.

5. The stop control apparatus for the internal combustion engine according to claim 1, comprising:
   a motor which is configured to output torque to a crank shaft of the internal combustion engine; and
   a motor controlling device which is configured to control said motor to output adjusting torque when the internal combustion engine stops, the adjusting torque being configured to adjust a crank angle when the internal combustion engine stops to be a predetermined value.

\* \* \* \* \*